(12) United States Patent
Wood et al.

(10) Patent No.: US 10,084,192 B2
(45) Date of Patent: Sep. 25, 2018

(54) CATHODE CONTACT LAYER DESIGN FOR PREVENTING CHROMIUM CONTAMINATION OF SOLID OXIDE FUEL CELLS

(71) Applicant: Versa Power Systems Ltd., Calgary (CA)

(72) Inventors: Anthony Wood, Calgary (CA); Hongpeng He, Calgary (CA); Tahir Joia, Calgary (CA)

(73) Assignee: VERSA POWER SYSTEMS, LTD, Danbury, CT (US)

( * ) Notice: Subject to any disclaimer, the term of this patent is extended or adjusted under 35 U.S.C. 154(b) by 579 days.

(21) Appl. No.: 14/220,688

(22) Filed: Mar. 20, 2014

(65) Prior Publication Data
US 2015/0270558 A1 Sep. 24, 2015

(51) Int. Cl.
| | |
|---|---|
| *H01M 8/0247* | (2016.01) |
| *H01M 8/0217* | (2016.01) |
| *H01M 8/0228* | (2016.01) |
| *H01M 8/021* | (2016.01) |
| *H01M 8/0215* | (2016.01) |
| *H01M 8/0226* | (2016.01) |

(Continued)

(52) U.S. Cl.
CPC ......... *H01M 8/0247* (2013.01); *H01M 8/021* (2013.01); *H01M 8/0215* (2013.01); *H01M 8/0217* (2013.01); *H01M 8/0226* (2013.01); *H01M 8/0228* (2013.01); *H01M 8/0236* (2013.01); *H01M 8/0243* (2013.01); *H01M 8/0245* (2013.01); *H01M 2008/1293* (2013.01)

(58) Field of Classification Search
CPC .. H01M 8/0247; H01M 8/021; H01M 8/0215; H01M 8/0217; H01M 8/0228; H01M 8/0236; H01M 8/0245
See application file for complete search history.

(56) References Cited

U.S. PATENT DOCUMENTS

| | | | | |
|---|---|---|---|---|
| 4,761,349 A | * | 8/1988 | McPheeters | H01M 8/2435 429/456 |
| 5,021,137 A | * | 6/1991 | Joshi | C25B 1/02 204/242 |

(Continued)

FOREIGN PATENT DOCUMENTS

| | | |
|---|---|---|
| EP | 1676624 A2 | 7/2006 |
| EP | 1 950 824 A1 | 7/2008 |

(Continued)

OTHER PUBLICATIONS

International Search Report and Written Opinion dated Jun. 9, 2015 regarding Application No. PCT/US2015/021165.

(Continued)

*Primary Examiner* — Ula Corinna Ruddock
*Assistant Examiner* — Thomas H. Parson
(74) *Attorney, Agent, or Firm* — Foley & Lardner LLP (57) ABSTRACT

In embodiments, a fuel cell stack is provided that includes an interconnect between a first fuel cell and a second fuel cell, and a contact layer in contact with, and disposed between, an electrode of the first fuel cell and the interconnect. The contact layer may include a chromium-getter material. This chromium-getter material may consist of lanthanum oxide, lanthanum carbonate, and/or calcium carbonate.

18 Claims, 9 Drawing Sheets

(51) Int. Cl.
*H01M 8/0236* (2016.01)
*H01M 8/0243* (2016.01)
*H01M 8/0245* (2016.01)
*H01M 8/124* (2016.01)

(56) References Cited

U.S. PATENT DOCUMENTS

| | | | |
|---|---|---|---|
| 5,976,723 | A | 11/1999 | Boffito et al. |
| 6,420,064 | B1 | 7/2002 | Ghosh et al. |
| 6,444,304 | B1 | 9/2002 | Hisamoto et al. |
| 6,653,009 | B2 | 11/2003 | Wang et al. |
| 7,190,568 | B2 | 3/2007 | Wood et al. |
| 7,802,698 | B2 | 9/2010 | Taylor et al. |
| 7,989,374 | B2 | 8/2011 | Drake et al. |
| 8,067,129 | B2 * | 11/2011 | Couse .............. H01M 4/8885 429/479 |
| 8,173,328 | B2 | 5/2012 | Rakowski et al. |
| 2005/0048357 | A1 | 3/2005 | Badding et al. |
| 2006/0166053 | A1 | 7/2006 | Badding et al. |
| 2006/0285993 | A1 | 12/2006 | Rakowski |
| 2007/0237999 | A1 | 10/2007 | Donahue et al. |
| 2009/0004545 | A1 | 1/2009 | Haltiner et al. |
| 2009/0317705 | A1 | 12/2009 | Alinger et al. |
| 2010/0015473 | A1 | 1/2010 | Hendriksen et al. |
| 2010/0119886 | A1 * | 5/2010 | Nielsen .............. H01M 8/0217 429/465 |
| 2010/0129731 | A1 | 5/2010 | Warrier et al. |
| 2011/0039191 | A1 | 2/2011 | Trofimenko et al. |
| 2011/0100805 | A1 | 5/2011 | Lonnroth et al. |
| 2011/0198216 | A1 | 8/2011 | Larsen et al. |
| 2011/0275006 | A1 | 11/2011 | Hawkes et al. |
| 2012/0171464 | A1 | 7/2012 | Kailer et al. |
| 2013/0129557 | A1 | 5/2013 | Herchen et al. |
| 2013/0130154 | A1 | 5/2013 | Darga et al. |
| 2013/0230792 | A1 * | 9/2013 | Wilson .............. H01M 8/0208 429/509 |
| 2014/0057184 | A1 * | 2/2014 | Pillai .............. H01M 8/0662 429/410 |

FOREIGN PATENT DOCUMENTS

| | | |
|---|---|---|
| EP | 1950824 | 7/2008 |
| JP | 07-153469 | 6/1995 |
| JP | 07-326377 A | 12/1995 |
| JP | 2008-521179 T | 6/2008 |
| JP | 2009-531830 A | 9/2009 |
| JP | 2010/033747 A | 2/2010 |
| JP | 2010-033747 A | 2/2010 |
| JP | 2010-516024 A | 5/2010 |
| JP | 2011129491 A1 | 6/2011 |
| JP | 2011-165666 | 8/2011 |
| JP | 2012-225337 A | 11/2012 |
| JP | 2013-054970 A | 3/2013 |
| JP | 2013-176764 A | 9/2013 |
| JP | 2015-501509 A | 1/2015 |
| JP | 2015-106445 A | 6/2015 |
| WO | WO-2008/083788 | 7/2008 |

OTHER PUBLICATIONS

International Search Report and Written Opinion dated Sep. 1, 2015 regarding Application No. PCT/US2015/020872.
Montero, X., "Spinel and Perovskite protection layers between Crofer22APU and La0.8Sr0.2FeO3 cathode materials for SOFC interconnects." *Journal of the Electrochemical Society* vol. 156, Issue 1 (2009): pp. B188-B196.
Tietz, F., et al., "Interface reactions between electrically conductive ceramics and ferritic steel-I. The system Cr-22Fe-0.5Mn/Mn$_2$O$_3$/(La,Ca)(Cr,Co,Cu)O$_3$." *Materials Science and Engineering: B* vol. 150 Issue 2(2008): pp. 135-140.
Wilkinson, L.T., et al., "Ag-Perovskite composite materials for SOFC cathode-interconnect contact." *Journal of the Electochemical Society* vol. 156, Issue 8 (2009): pp. B905-B912.
Yang, Z., et al., "Electrical contacts between cathodes and metallic interconnects in solid oxide fuel cells." *Journal of Power Sources* vol. 155, Issue 2 (2006): pp. 246-252.
U.S. Office Action for U.S. Appl. No. 14/220,867 dated Mar. 1, 2016.
U.S. Office Action for U.S. Appl. No. 14/220,867 dated Jun. 15, 2016.
International Preliminary Report on Patentability received for PCT/US2015/020872 (13 pages) Sep. 29, 2016.
International Preliminary Report on Patentability received for PCT/US2015/021168 (7 pages) Sep. 29, 2016.
Office Action in CA Pat Appl No. 2942898 dated Oct. 12, 2017 (5 pages).
Office Action in JP Pat Appl No. 2017-501092 dated Oct. 13, 2017 (3 pages).
Office Action issued in EP15713298.6 dated Oct. 12, 2017 (5 pages).
Office Action in JP2017-501074 dated Sep. 25, 2017, with English translation (7 pages).
Final Rejection in JP Appl. No. JP2017-501074 dated May 7, 2018, with English translation (6 pages).
Lecomte-Beckers et al; Materials for Advanced Power Engineering 2006 Proceedings of the 8th Liege Conference Part 1, Schriften des Forschungszentrums Julich Reihe Energietechnik/Energy Technology Band/vol. 53, Part I, 2006; Forschungzentrum Julich http://www.iaea.org/inis/collection/nclcollectionstore/_public/38/077/38077087.pdf.
Office Action in CA Appl. No. 2942898 dated Jun. 8, 2018 (4 pages).
Singhal et al.; High Temperature Solid Oxide Fuel Cells: Fundamentals, Design and Applications; 2003 Elsevier; p. 142.

* cited by examiner

CATHODE CONTACT LAYER DESIGN FOR PREVENTING CHROMIUM CONTAMINATION OF SOLID OXIDE FUEL CELLS

CROSS-REFERENCE TO RELATED APPLICATION

This application is related to U.S. patent application Ser. No. 14/220,867, entitled "SYSTEMS AND METHODS FOR PREVENTING CHROMIUM CONTAMINATION OF SOLID OXIDE FUEL CELLS, Hongpeng He et al., filed on Mar. 20, 2014, the entire disclosure of which is incorporated herein by reference, for all purposes, as if fully set forth herein.

BACKGROUND OF THE INVENTION

High temperature fuel cells such as solid oxide fuel cells often include an electrolyte sandwiched between a cathode and an anode. Oxygen combines with electrons at the cathode to form oxygen ions which are conducted through an ion-conducting ceramic electrolyte to the anode. At the anode, oxygen ions combine with hydrogen and carbon monoxide to form water and carbon dioxide, thereby liberating electrons and generating current.

Multiple fuel cells are stacked and interleaved with interconnect plates, which distribute gases to the electrode surfaces and act as current collectors. Volatile chromium species from stainless steel components in the stack of cells, including the interconnects, degrade performance of cathodes in the fuel cells. These volatile species are carried in the airstream and deposit at electrochemically active cathode regions causing electrochemical cathode performance degradation. The degradation may also be exacerbated in the presence of humidity, which is often present in fuel cell stacks. The systems and methods described herein provide solutions to these and other needs.

BRIEF SUMMARY OF THE INVENTION

In embodiments, a fuel cell stack is provided that includes an interconnect between a first fuel cell and a second fuel cell, and a contact layer in contact with, and disposed between, an electrode of the first fuel cell and the interconnect. The contact layer may include a chromium-getter material. This chromium-getter material may consist of lanthanum oxide, lanthanum carbonate, and/or calcium carbonate.

In embodiments, a fuel cell stack is provided that includes an interconnect between a first fuel cell and a second fuel cell, and a contact layer in contact with, and disposed between, an electrode of the first fuel cell and the interconnect. The contact layer may include a chromium-getter material. The chromium-getter material may consist of lanthanum oxide or an inorganic carbonate, nitrate, hydroxide, or acetate that reacts with chromium vapor in the range of 300 to 850° C.

In embodiments, a method of forming a chromium-getter contact layer and fuel cell may include applying a first layer to the fuel cell electrode or a fuel cell interconnect. The first layer may include a perovskite material. The method may also include applying a second layer to the first layer. The second layer may include a chromium-getter material, which may consist of lanthanum oxide, barium oxide, sodium oxide, lithium oxide and/or an inorganic carbonate, nitrate, hydroxide, or acetate that react with chromium vapor in the range of 300 to 850° C.

BRIEF DESCRIPTION OF THE DRAWINGS

The present invention is described in conjunction with the appended figures.

DETAILED DESCRIPTION OF THE INVENTION

Embodiments described herein include materials that may be used as a selective chromium filter in a solid oxide fuel cell (SOFC) stack and/or system operating in a temperature range of 300 to 850° C. Additionally, such filters may also be used in solid oxide electrolyzers, reversible solid oxide cells, gas purification membrane devices such as an oxygen transport membrane, and/or any device that incorporates a ceramic or cermet electrode that may suffer performance degradation from chromium vapor species in the temperature range of 300 to 1000° C.

Figure 1:
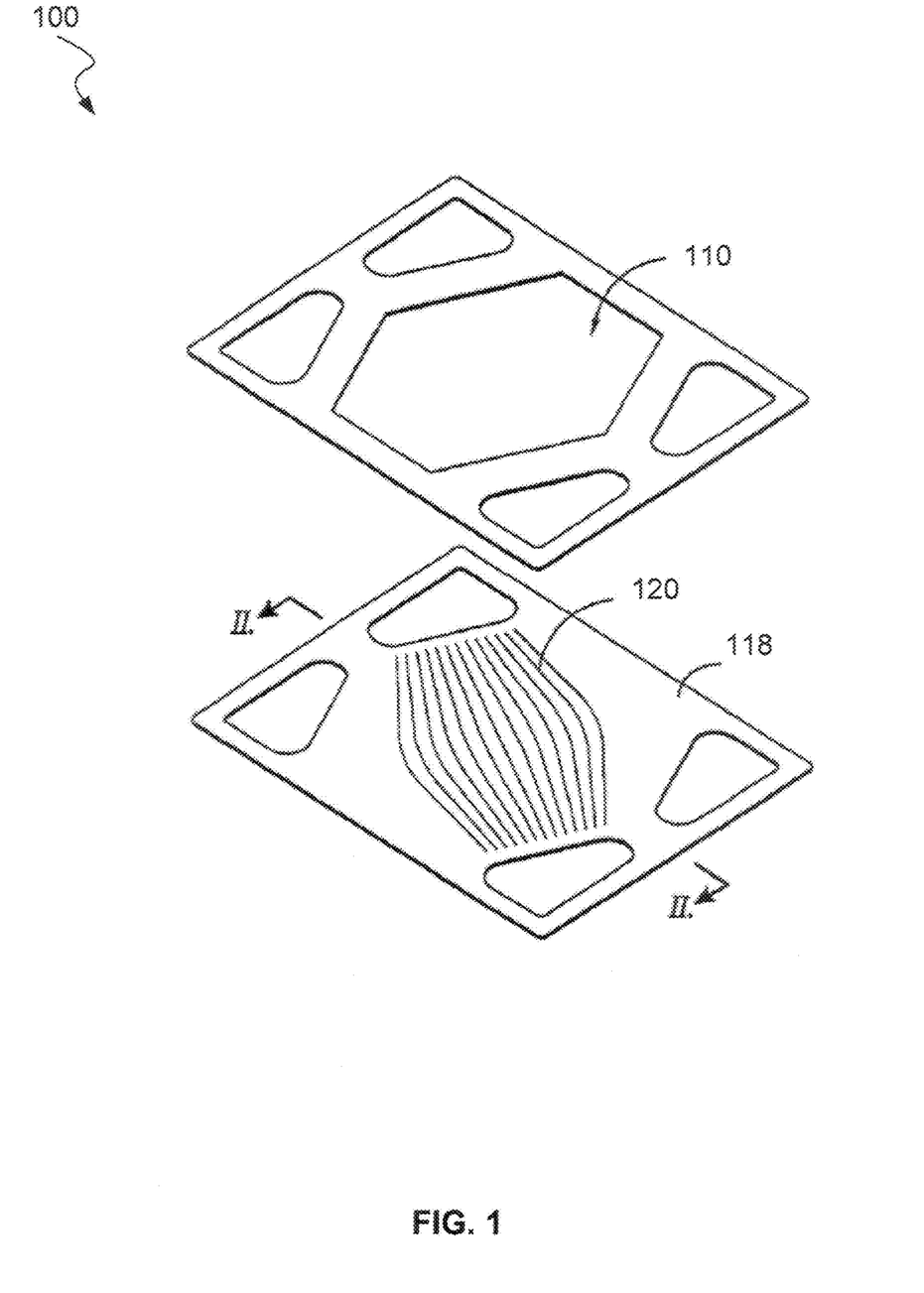
FIG. 1 shows an example portion of one possible fuel cell stack embodiment of the invention in an exploded view.
Figure 2:
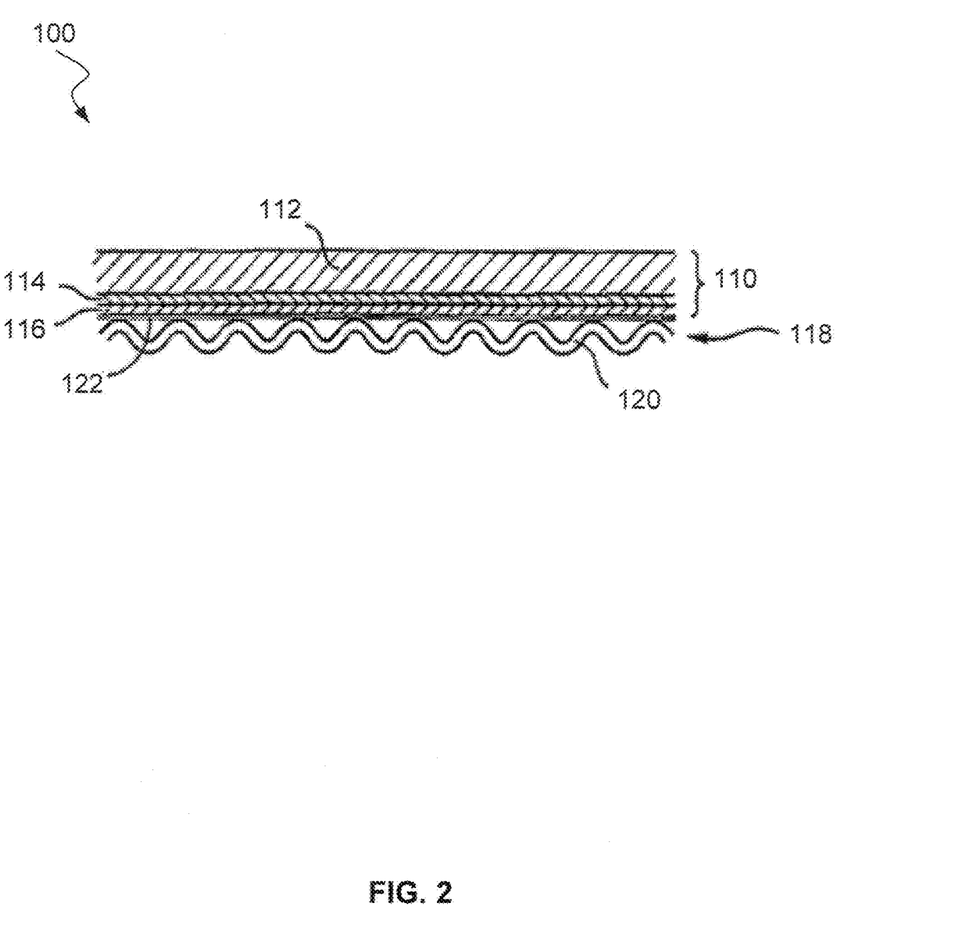
FIG. 2 shows an example cross section of one possible fuel cell stack of the invention.

In embodiments, a fuel cell stack that has an interconnect between a first fuel cell and a second fuel cell is provided with a contact layer coated with a chromium-getter material. The fuel cell stack may be useful for reducing chromium contamination of a fuel cell. In some embodiments, the fuel cell stack may be a solid oxide fuel cell. In other embodiments, different types of fuel cell stacks may be provided. Turning to FIG. 1, a portion of a fuel cell stack 100 in an exploded view is shown. FIG. 2 shows the cross section of an embodiment of the fuel cell stack along the line II. in FIG. 1. A single fuel cell 110 includes an anode 112 supported structure having a thin electrolyte 114 and cathode 116. A single fuel cell stack repeating layer includes fuel cell 110 and an interconnect 118, which may be a monolithic plate having flow-directing ribs 120 as shown in FIG. 1. Ribs 120 may assist in providing an even distribution of airflow across the entire surface of cathode 116 between air intake and exhaust manifolds of the stack. Cathode 116 may include a composite material, which includes a noble metal such as palladium and a ceramic, such as yttrium stabilized zirconium, as described in co-owned U.S. Pat. No. 6,420,064, the contents of which are incorporated herein by reference, for all purposes, as if fully set forth herein. Depending on the embodiment, cathode design may also be in accordance with U.S. Pat. Nos. 7,802,698 and 7,190,568, which are incorporated herein by reference for all purposes, as if fully set forth herein. In some embodiments, cathode 116 may be a purely ceramic-based cathode. A contact layer 122 may be disposed between cathode 116 and interconnect 118 by applying contact layer 122 material to one or both of cathode 116 and/or the face of interconnect 118 during assembly of the fuel cell stack.

The fuel cell stack may also have a similar or different contact layer disposed between anode 112 and interconnect 118. In many embodiments, interconnect 118 may be a source of chromium within the fuel cell stack. Interconnect 118 and/or any other portion of the fuel cell stack may also have a protective coating to mitigate chromium poisoning. Such a coating may include manganese cobalt oxide spinel phases.

In some embodiments, the contact layer 122 may have a thickness of between about 20 μm and about 525 μm. Contact layer 122 may also include at least two outer layers and a central layer. The central layer may include electrically conductive materials. In these or other embodiments, the central layer may have a porosity of between about 25% and about 70% or between about 30% and about 50%. The central layer may have a thickness of between about 10 μm and about 250 μm.

In some embodiments, the outer contact layers may include fine conductive particles while the central layer may include coarse conductive particles. In these or other embodiments, the conductive particles in either or both the fine and coarse layers may include conductive perovskites. Fine conductive particles may be particles with diameters less than about 2 μm or between about 0.3 μm and about 1.1 μm. Coarse particles may include particles that are, on average, at least one and a half times the average particle diameter of the fine particles, and/or greater than about twice the average diameter of the fine particles. The coarse particles may have average diameters greater than about 1 μm and/or greater than about 1.5 μm.

Figure 3:
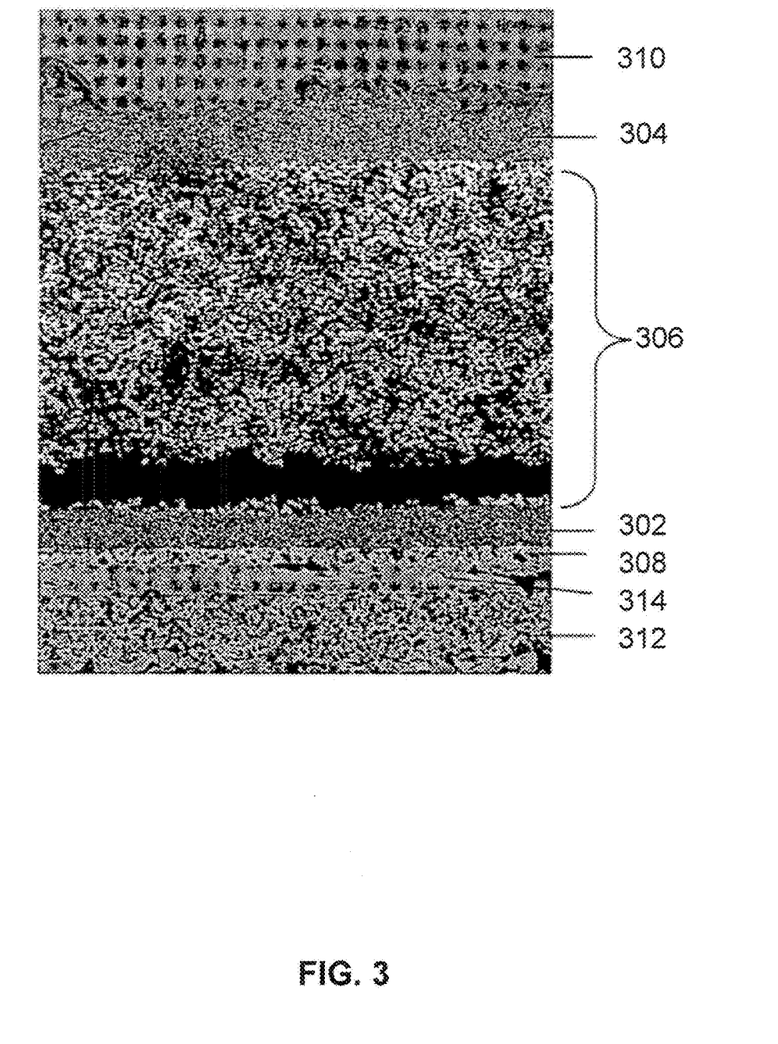
FIG. 3 is a scanning electron microscope (SEM) photograph of a multilayer contact material in between a fuel cell and an interconnect in one embodiment of the invention.

In some embodiments, contact layer 122 may be applied in the form of a contact paste material. As shown in FIG. 3, via a SEM photograph of an example fuel cell, a contact paste material may be applied in a multilayer configuration (302, 304, 306). In these or other embodiments, contact paste may be applied in three layers in which outer layer 302 adheres to a fuel cell cathode 308 and outer layer 304 adheres to the interconnect 310. The central layer 306 may have coarse particles sandwiched between the outer layers 302 and 304. An electrolyte 314 may be disposed between cathode 308 and anode 312.

In these or other embodiments, cathode 308 may be a ceramic fuel cell electrode, and outer layer 302 may not be present such that central layer 306 may be directly adjacent to the cathode 308. In some embodiments, electrolyte 314 may be a single layer (e.g. yttria stabilized zirconia), or a bilayer electrolyte (e.g. gadolinia doped ceria adjacent to cathode 308 and yttria stabilized zirconia adjacent to this layer).

In one embodiment, contact layer 122 may include a chromium-getter material. In some embodiments, contact layer 122 may have pores, and at least a portion of the chromium-getter material may be disposed within at least a portion of the pores. The chromium-getter materials may be included as a powder (e.g., calcium carbonate and/or lanthanum oxide) and such powder may be substituted for some of the ceramic powder otherwise present in contact layer 122 (e.g., substituting calcium carbonate for perovskite powder). The chromium-getter material may be less than about 50% by volume of the contact layer, or it may be less than about 33% by volume of the contact layer. In these or other embodiments, the chromium-getter material may be about 20% by volume of contact layer 122.

Contact layer 122 may have an inorganic material volume. The inorganic material volume is defined as the volume of the contact layer minus the volume of the pores and the volume of any organic material in the contact layer. The chromium-getter material may be between about 15% and about 33%, between about 10% and 33%, or between about 1% and about 50% by volume of the inorganic material volume of the contact layer after heat treatment in the range of 600 to 850° C.

In some embodiments, the chromium-getter material may include lanthanum oxide, lanthanum carbonate, or calcium carbonate. The chromium-getter material may also include barium oxide, lithium oxide, or sodium oxide. In these or other embodiments, the chromium-getter material may include barium carbonate, lithium carbonate, or sodium carbonate. The chromium-getter material may also include mixtures of these or different compounds, such as inorganic carbonates, nitrates, hydroxides, or acetates. The carbonates, nitrates, hydroxides, and acetates may include lanthanum, barium, calcium, lithium, or sodium in embodiments. In some embodiments, the chromium-getter material may lower the conductivity of the contact layer, but any potential decrease in conductivity may be offset by slower degradation of the electrode due to the chromium-getter reducing chromium contamination of the cathode and/or other portions of the fuel cell.

In these or other embodiments, inorganic carbonates may include hydrogen carbonates. The inorganic carbonate may react with chromium such that the inorganic carbonate captures chromium atoms at an atomic percent ratio of cation to chromium of between about 1 and about 1.7 to 1. Barium carbonate, calcium carbonate, and lanthanum carbonate may absorb or react with volatile chromium species at atomic percent ratios of cation to chromium up to 1:1. The inorganic carbonate may be lanthanum carbonate, calcium carbonate, lithium carbonate, sodium carbonate, sodium hydrogen carbonate, and/or barium carbonate. The inorganic oxide may include a cation that captures chromium atoms at an atomic percent ratio of cation to chromium of between about 1 and about 1.7 to 1. The chromium-getter material may comprise lanthanum, barium, calcium, lithium, sodium, and/or oxides thereof. The compounds described herein, as part of the fuel cell stack, may help reduce chromium contamination in the fuel cell.

Figure 4:
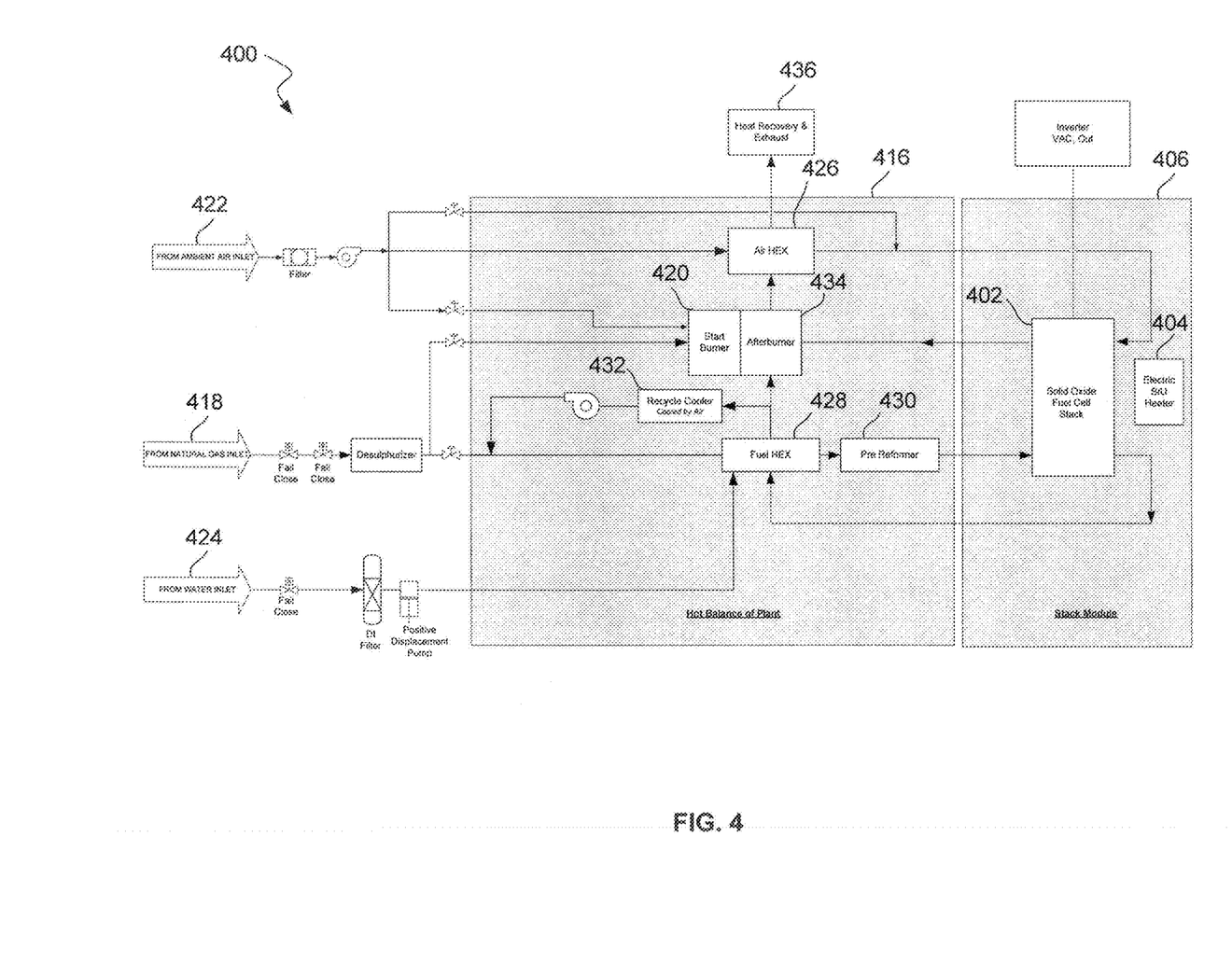
FIG. 4 shows an example process flow diagram of one possible fuel cell system of the invention.

The fuel cell stack may be part of a fuel cell system. FIG. 4 shows one possible fuel cell system 400 with a solid oxide fuel cell stack 402. Solid oxide fuel cell stack 402 may be fuel cell stack 100 in FIGS. 1 and 2. Solid oxide fuel cell stack 402 along with an electrical startup heater 404 may be part of a stack module 406. Solid oxide fuel cell stack 402 may include a stack manifold, which may distribute gases to the stack.

Stack module 406 may be connected to a hot balance of plant 416. Stack module 406 may be in a stack hot box. The stack hot box may be an insulated box that includes a stack module and most or all of hot balance of plant 416. Input streams into hot balance of plant 416 may include a natural gas inlet 418. Natural gas inlet 418 may provide input gases, including hydrogen, for solid oxide fuel cells stack 402. Natural gas may also be combusted in a start burner 420. An ambient air inlet 422 may provide ambient air, including oxygen, to solid oxide fuel cell stack 402. A water inlet 424 may provide water for hot balance of plant 416. Hot balance of plant 416 may include other components, including an air heat exchanger 426, a fuel heat exchanger 428, a pre reformer 430, a recycle cooler 432, and an afterburner 434. Hot balance of plant 416 may also include hot system piping to connect various components. Hot balance of plant 416 may be connected to a heat recovery and exhaust unit operation 436.

Figure 5:
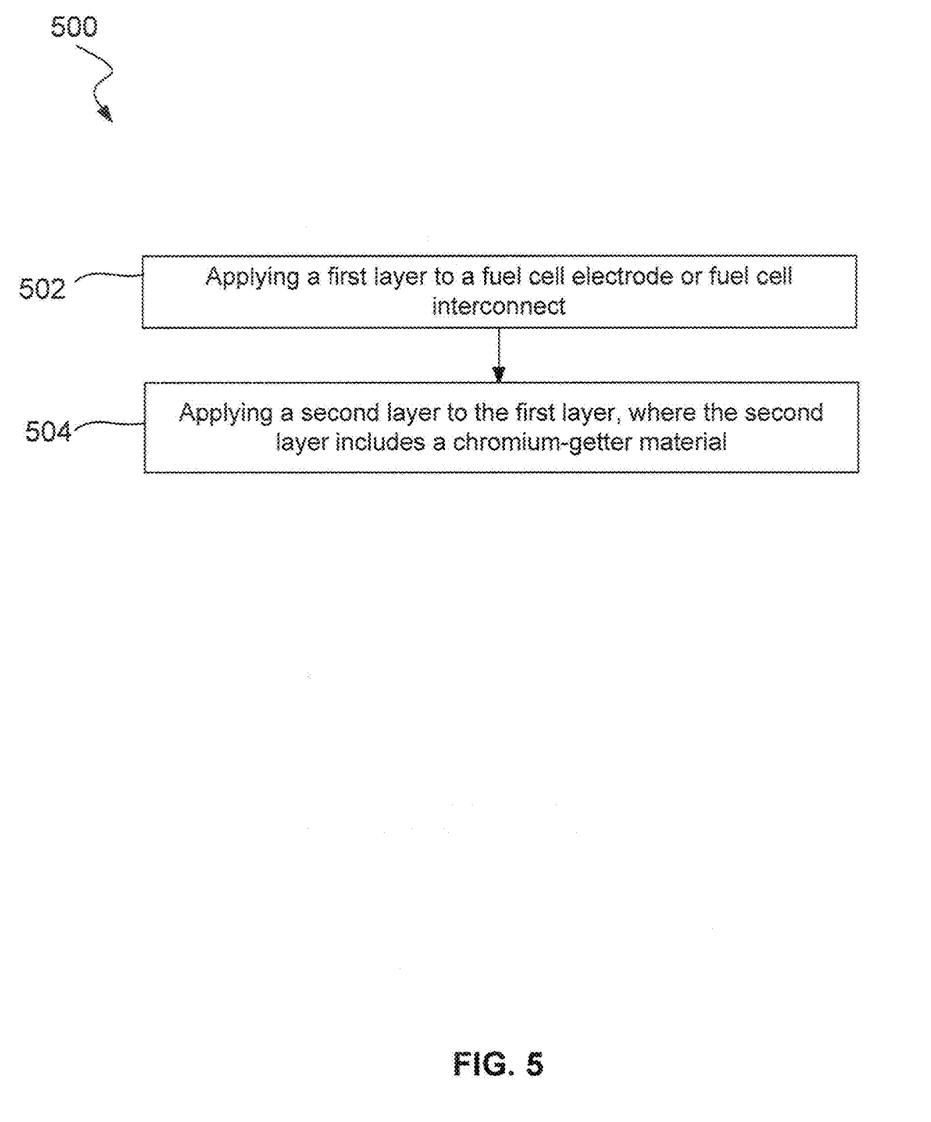
FIG. 5 is a block diagram of one embodiment of the invention for reducing chromium contamination in a fuel cell.

FIG. 5 shows one possible method 500 of the invention for reducing chromium contamination of components in a fuel cell. This method may help reduce chromium contamination and improve fuel cell performance. The method may, at step 502, include applying a first layer to the fuel cell electrode or a fuel cell interconnect. The first layer may include a perovskite material. The first layer may also include lanthanum cobalt nickel oxide (LCN) particles, and/or lanthanum cobalt oxide (LC) particles. The LCN particles may have an average particle size of about 1.0 µm with about 50% of the particles falling in the range of about 0.5 µm to about 1.1 µm. The layer of LCN particles may be less than about 25 µm thick and may or may not be sintered.

The method, at step 504, may also include applying a second layer to the first layer. The second layer may be applied by screen printing onto the first layer and drying thereafter. The second layer may have LCN particles with an average particle size of between about 1.5 µm and about 3 µm. The majority of the particles may fall in the range of between about 1 µm and about 10 µm. This second layer may be referred to as the coarse LCN layer, cLCN layer, and/or the stress relief layer.

In embodiments, a pore-forming material may be added to the second layer, and this addition may result in the second layer including pores after formation. Chromium-getter material may be disposed within the pores of the second layer. In these or other embodiments, a third layer of LCN particles may be screen printed onto the second layer. The multiple layers may provide better long-term cell stability by providing a sacrificial fracture layer in the central layer, which helps absorb expansion mismatches during thermal cycling and long-term operation. The fracture layer, which may contain a chromium-getter material, may also absorb chromium vapors. The chromium-getter material may include any of the compounds previously discussed herein. Although the fracture layer may absorb chromium, such absorption may not restrict airflow to the cathode due to the high porosity of the layer.

In these or other embodiments, one possible method of the invention for reducing chromium contamination of components in a fuel cell is provided. Reducing chromium contamination of components in a fuel cell may improve the performance of a fuel cell through increased runtime and/or higher cell voltage. A substrate may be provided. The substrate may be an inert substrate and may include alumina. The substrate may be coated with a chromium-getter material, which may be any of the compounds previously discussed herein. The chromium-getter material may be in pellet form, powder form, or any other form including these compounds. The coating process may cause the chromium-getter material to become bonded to the substrate through covalent, ionic, or other bonds. Thus, the coating may be more firmly attached to the substrate.

In some embodiments, a method may include disposing the coated substrate in a solid oxide fuel cell stack or system. In some embodiments, the coated substrate may be disposed in a stack manifold, hot system piping, and/or a stack hot box of an SOFC system. In these or other embodiments, the coated substrate may also be located in the air flow stream of an SOFC interconnect or any air flow channels of a solid oxide fuel cell. In some embodiments, it may be desirable to place the coated substrate at any location in an SOFC system that reaches a temperature of above about 300° C. The coated substrate may assist in capturing chromium species from stainless steel or other components found in the SOFC stack and/or system. In some embodiments, the method may also include placing the chromium-getter material as a stand-alone component (without a substrate) in the same or other locations within a solid oxide fuel cell stack or system. In some cases, the chromium-getter material may be disposed without a substrate in a column or other component. Such a column or component may be packed with powder or pellets of the chromium-getter material. By disposing the coated substrate with a chromium-getter material in the locations discussed herein, the chromium-getter material may help reduce chromium contamination and improve the performance of a fuel cell.

EXAMPLE 1

Several oxide powders (manganese, zinc, cobalt, copper, tin, and nickel oxides) were tested in a tube furnace for their ability in capturing chromium. Chromium oxide powder was placed in a crucible with a piece of porous stainless steel on top. The oxide powders were placed on top of the porous stainless steel. The tests were performed at 750° C. for 1000 hours in flowing air with 10% humidity. After testing, the oxide powders were weighed to determine mass changes and energy dispersive x-ray spectroscopy (EDX) analysis was done to see if any chromium species were absorbed on the powders. However, no chromium was detected in the tested powders.

EXAMPLE 2

Several oxide powders (lanthanum, copper, manganese, tin, zinc, and cobalt oxides) were tested in a tube furnace for their ability to capture chromium. Chromium pieces, not chromium oxide powder, were placed in a crucible with a piece of porous stainless steel on top. The oxide powders were placed on top of the porous stainless steel. The tests were performed at 750° C. for 1000 hours in flowing air with 10% humidity. After testing, the oxide powders were weighed to determine mass changes and EDX analysis was done to see if any chromium species were absorbed on the powders. Only the lanthanum oxide sample showed chromium species on the surface in this example. Areas of the sample with chromium were yellowish color and contained up to 20 to 25 atomic percent of chromium compared with lanthanum. This example shows that while lanthanum oxide may be a chromium-getter material, not all inorganic oxides can be used as chromium-getter materials.

EXAMPLE 3

Several powders were tested in a tube furnace for their ability to capture chromium. These powders included barium carbonate, strontium carbonate, calcium carbonate, 20 mol % gadolinia doped ceria, neodymium oxide, and magnesium oxide. Chromium pieces, not chromium oxide powder, were placed in a crucible with a piece of porous stainless steel on top. The powders were placed on top of the porous stainless steel. The tests were performed at 750° C. for 1000 hours in flowing air with 10% humidity. After testing, the powders were weighed to determine mass changes and EDX analysis was done to see if any chromium species were absorbed on the powders. Barium carbonate and calcium carbonate showed the best ability to capture chromium in this example. The 20 mol % gadolinia doped ceria and magnesium oxide did not capture any chromium species. Neodymium oxide changed color on the surface (indicating chromium capture) but EDX analysis could not be performed because of low conductivity even after coating the sample with gold.

The morphology of barium carbonate and calcium carbonate changed after the 1000 hours test. The new compounds appeared denser. Reacted areas showed a different morphology indicating different amounts of chromium captured. Barium:chromium ratios of 1.7:1 were found. Calcium:chromium ratios of 1:1 were found. These tests demonstrate that compounds with atoms from the same group of the periodic table (e.g., calcium, barium, magnesium) may not all be effective chromium-getter materials.

EXAMPLE 4

Figure 6:
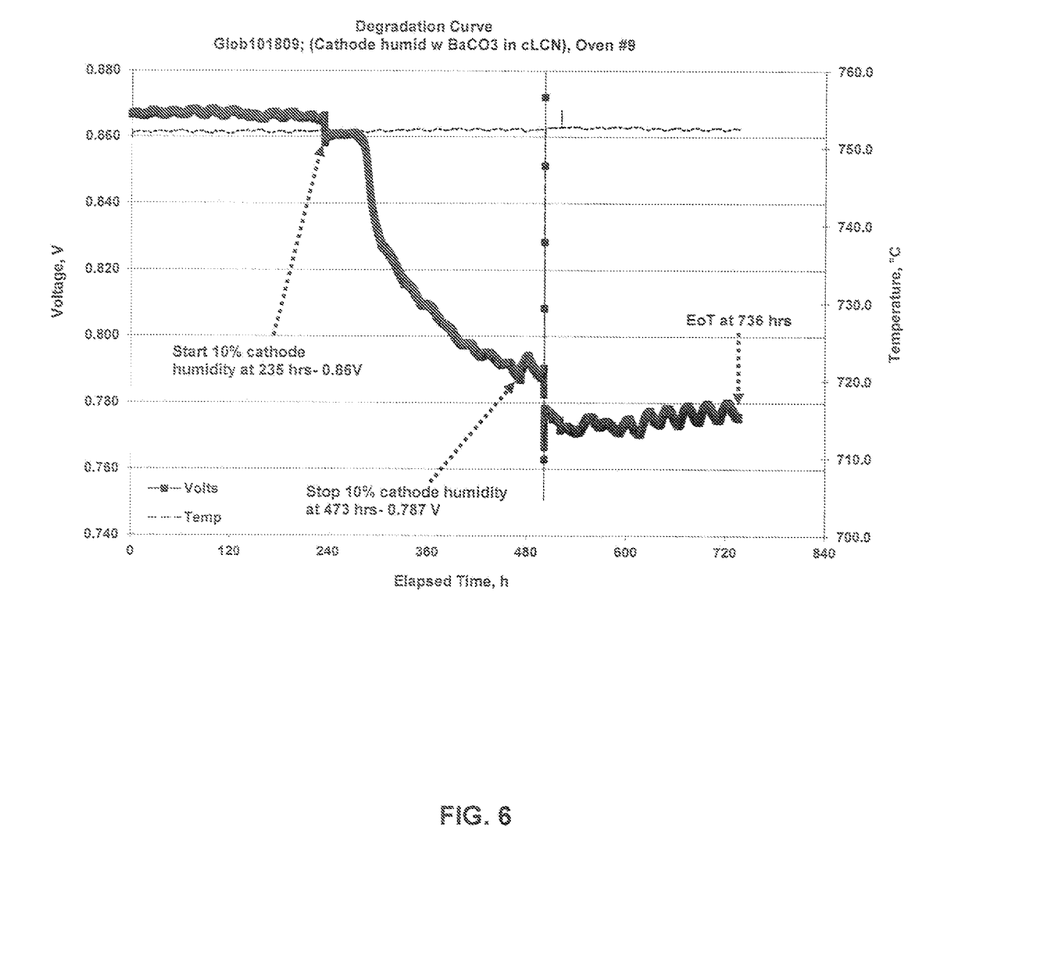
FIG. 6 shows of the results of a cathode performance test using a barium carbonate powder blended with a contact paste and applied to a single cell.

Barium carbonate powder was blended with cLCN in contact paste and used in single-cell tests with cathode humidity. Barium carbonate replaced cLCN in the paste formulation at a ratio of 20% v/v of the cLCN content. Details of this formulation, with component amounts in weight percent, are shown in the third line of Table 1. Results of the test are shown in FIG. 6. The cell degraded quickly when 10% cathode humidity was introduced. Although the SEM shows the top surface of the cathode layer becoming denser after testing as a result of the absorption of chromium species, no or very little chromium was detected underneath the dense surface of the contact paste with EDX. On the surface, barium may have reacted with chromium to form large oxide particles, such as $BaCrO_4$ or other chromites, that may have blocked or significantly reduced gas flow to the cathode. Such reduced gas flow may be the result of chromium or other species physically absorbing within pores themselves. The shortage or lack of detectable chromium underneath the surface may be the result of some other blocking mechanism.

TABLE 1

| LCN coarse powder | Graphite | Lanthanum oxide | Calcium carbonate | Barium carbonate | Terpineol | Ethyl cellulose | Fish oil | Total |
|---|---|---|---|---|---|---|---|---|
| 54.7 | 7.4 | 11.8 | 0.0 | 0.0 | 22.2 | 1.5 | 2.5 | 100.0 |
| 60.3 | 8.2 | 0.0 | 5.4 | 0.0 | 22.2 | 1.5 | 2.5 | 100.0 |
| 57.8 | 7.8 | 0.0 | 0.0 | 8.3 | 22.2 | 1.5 | 2.5 | 100.0 |
| 58.9 | 8.0 | 5.5 | 1.5 | 0.0 | 22.2 | 1.5 | 2.5 | 100.0 |
| 45.8 | 8.3 | 15.7 | 4.1 | 0.0 | 22.2 | 1.5 | 2.5 | 100.0 |
| 58.9 | 8.0 | 2.9 | 4.1 | 0.0 | 22.2 | 1.5 | 2.5 | 100.0 |

EXAMPLE 5

In this example, chromium-getter materials were incorporated into the coarse LCN paste during the standard screen-printing ink process by triple-roll milling or high shear mixing of the ingredients in the desired quantities. Possible screen-printing ink formulations for lanthanum oxide and calcium carbonate additions are listed in Table 1. All values in the table are in weight percent.

EXAMPLE 6

Figure 7:
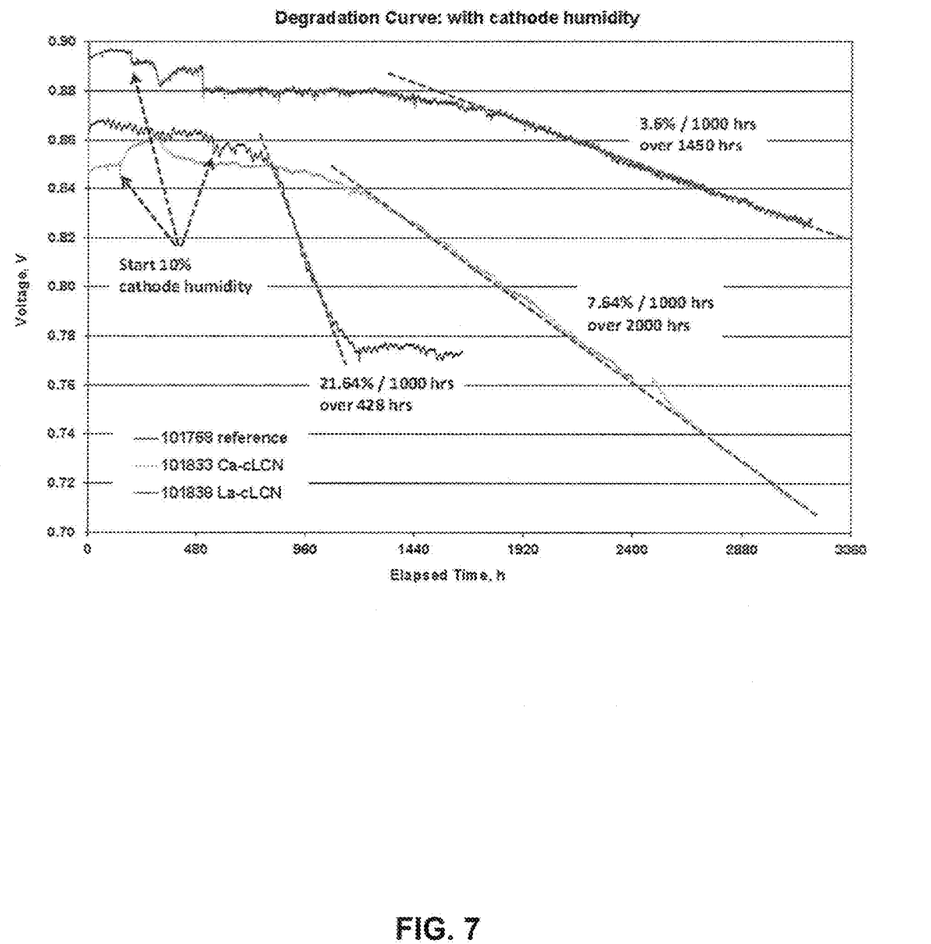
FIG. 7 is a graph of fuel cell voltage against time at fixed current density and gas flows for each of a reference case, a calcium-containing additive case, and a lanthanum-containing additive case.

Cell voltage was measured against time for various single cell tests. In these tests, baseline materials systems were compared to cells with calcium- or lanthanum-containing additives in the central contact layer. Chromium-getter material was added in the amount of 20% v/v of the inorganic content of the contact layer, and all tests were performed in 10% humidity to give a higher than expected concentration of volatile chromium species. FIG. 7 shows the cell test comparison for a reference cell with no chromium-filter material and cells with calcium or lanthanum addition. The reference case (labeled as 101768 reference) over 428 hours showed the equivalent of a 21.64% drop in voltage over 1,000 hours. The calcium test (labeled as 101833 Ca-cLCN and the second line in Table 1) over 2,000 hours showed the equivalent of a 7.64% drop in voltage over 1000 hours, while the lanthanum test (labeled as 101838 La-cLCN and the first line in Table 1) over 1450 hours showed the equivalent of a 3.6% drop in voltage over 1,000 hours. Thus, the reference case showed a decline in cell voltage that was both earlier and faster than tests with calcium- or lanthanum-containing additives. The calcium test was performed separately from lanthanum test. These tests showed that the addition of calcium or lanthanum in this example was effective at maintaining cell performance, potentially by capturing chromium species.

Incorporating lanthanum oxide into the cLCN layer also led to a significant reduction in degradation rate and had a much longer period with no increase in degradation when 10% humidity was introduced compared with dry air. FIG. 6 shows lanthanum outperformed calcium in this example.

EXAMPLE 7

Figure 8:
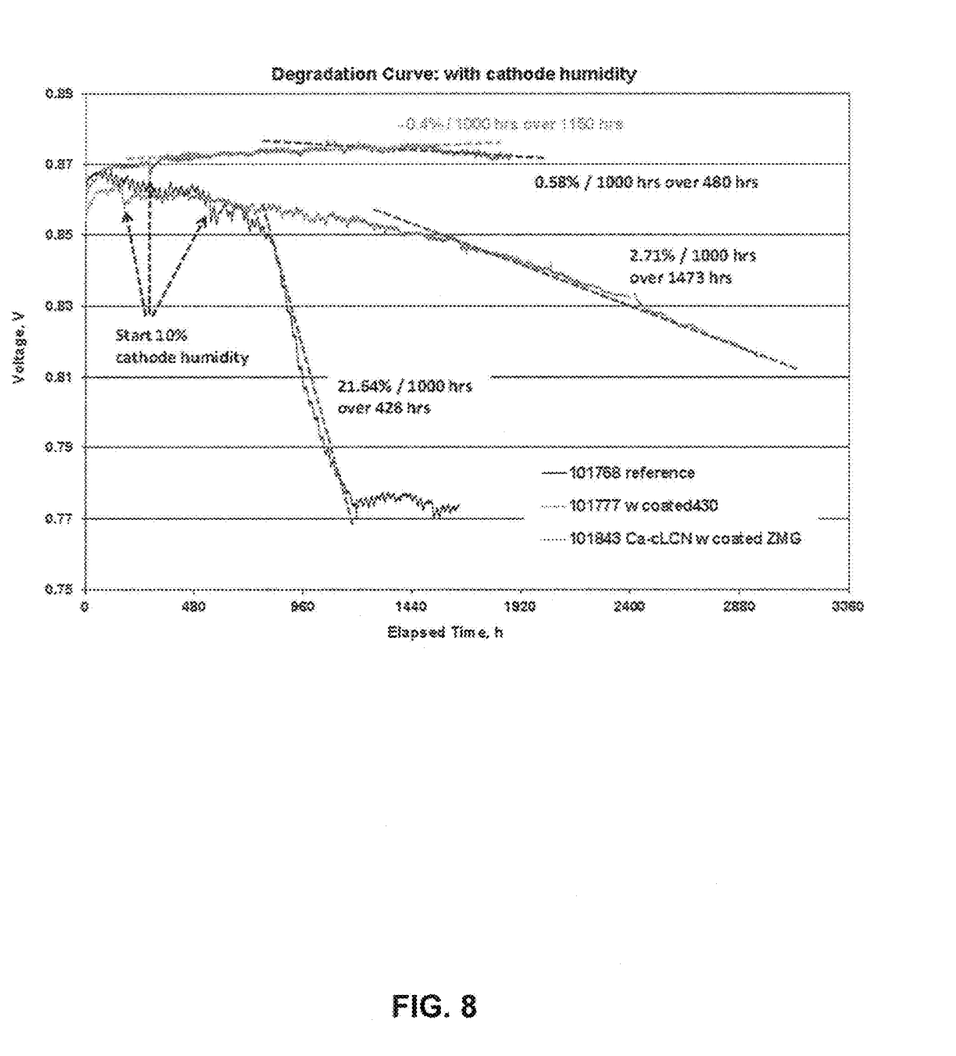
FIG. 8 is a graph of fuel cell voltage against time at fixed current density and gas flows for each of a reference case, a coated interconnect case, and a coated interconnect case with a calcium-containing additive.

Calcium-containing additives were added to the cLCN contact paste and tested in conjunction with a coated cathode jig and tested. For the purposes of this test, the coated cathode jig represents a stack interconnect and uses the same material used in an SOFC stack. FIG. 8 shows the effect of using a coated cathode jig (interconnect) alone and the improvement seen when using calcium carbonate in addition to a coating. As shown in FIG. 8, the 430SS interconnect coated with cobalt (labeled as 101777 w coated430) showed slower and less degradation than the uncoated reference case (labeled as 101768 reference). The addition of a calcium-containing additive along with a different coated interconnect (labeled as 101843 Ca-cLCN w coated ZMG) resulted in even slower and less degradation. In this example, the interconnect is ZMG 232 G10, a stainless steel with a slightly different composition from 430SS and may have better resistance to high temperature oxidation than 430SS. Over the testing duration, no degradation was seen in a coated interconnect with a calcium-containing additive, with the test showing the equivalent of a −0.4% drop in voltage over 1000 hours.

EXAMPLE 8

Figure 9:
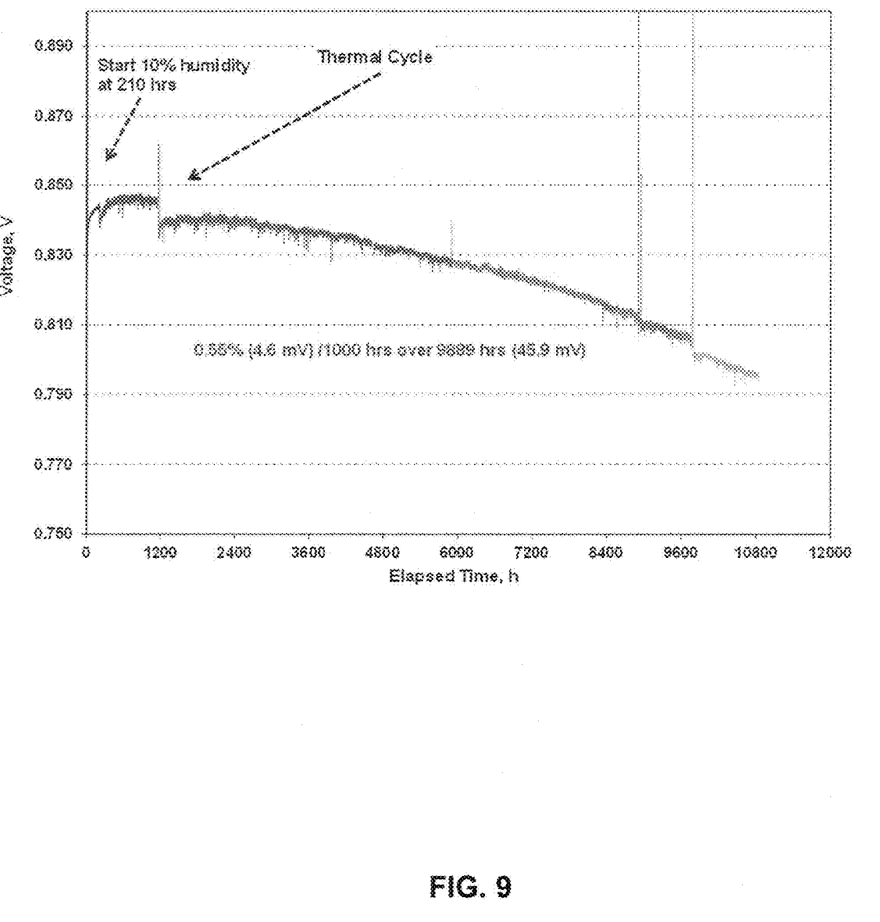
FIG. 9 is a graph of fuel cell voltage against time at fixed current density and gas flows for a coated interconnect case with a lanthanum- and calcium-containing additive.

A mixture of calcium carbonate and lanthanum oxide additives were added to the cLCN contact paste and tested in conjunction with a ZMG 232 G10 cathode jig coated with cobalt. FIG. 9 shows the effect of a coated cathode jig with the formulation in line 4 of Table 1. The ZMG 232 G10 jig coated with cobalt degraded slightly slower than the 430SS jig coated with cobalt. For the ZMG 232 G10 jig coated with cobalt and the calcium carbonate and lanthanum oxide additive, the test showed the equivalent of a 0.55% drop in voltage per 1000 hours operation.

EXAMPLE 9

After a cathode contact layer of a single cell was tested at 10% humidity for 1600 hours, the cathode contact layer was analyzed by SEM and EDX. The central contact layer had a 20% v/v calcium carbonate additive. The results of the EDX analysis are shown in Table 2, with all results in atomic percent. The EDX analysis showed that calcium had a near 1:1 atomic ratio with chromium after testing, indicating it may be an effective chromium-getter.

TABLE 2

| Spectrum | O | Ca | Cr | Co | Ni | La |
|---|---|---|---|---|---|---|
| 1 | 79.04 | 8.68 | 8.78 | 0.98 | 0.66 | 1.86 |
| 2 | 71.33 | 12.51 | 13.50 | 0.64 | 0.62 | 1.40 |

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment, or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The term "about" when used to modify a numerical value indicates a level of precision around that numerical value as expected by a skilled artisan. The invention has now been described in detail for the purposes of clarity and understanding. However, it will be appreciated that certain changes and modifications may be practice within the scope of the appended claims.

What is claimed is:

1. A fuel cell stack comprising:
an interconnect disposed between a first fuel cell and a second fuel cell; and
a contact layer in contact with, and disposed between, an electrode of the first fuel cell and the interconnect, wherein the contact layer comprises:
a porous electrically conductive material, and
a chromium-getter material disposed in pores of the porous electrically conductive material, the chromium-getter material being selected from the group consisting of:
lanthanum oxide,
barium oxide,
lithium oxide,
sodium oxide,
an inorganic carbonate, nitrate, hydroxide, or acetate that reacts with chromium vapor in a range of 300 to 850° C.

2. The fuel cell stack of claim 1, wherein:
the chromium-getter material is less than about 50% by volume of the contact layer.

3. The fuel cell stack of claim 1, wherein:
the chromium-getter material is less than about 33% by volume of the contact layer.

4. The fuel cell stack of claim 1,
wherein the contact layer has an inorganic material volume defined as a volume of the contact layer minus a volume of the pores and minus a volume of any organic material in the contact layer; and
wherein the chromium-getter material comprises between about 15% and about 33% by volume of the inorganic material volume of the contact layer after heat treatment in a range of 600 to 850° C.

5. The fuel cell stack of claim 1,
wherein the contact layer has an inorganic material volume defined as a volume of the contact layer minus a volume of the pores and minus a volume of any organic material in the contact layer; and
wherein the chromium-getter material comprises between about 10% and 33% by volume of the inorganic material volume of the contact layer after heat treatment in a range of 600 to 850° C.

6. The fuel cell stack of claim 1,
wherein the contact layer has an inorganic material volume defined as a volume of the contact layer minus a volume of the pores and minus a volume of any organic material in the contact layer; and
wherein the chromium-getter material comprises between about 1% and about 50% by volume of the inorganic material volume of the contact layer after heat treatment in a range of 600 to 850° C.

7. The fuel cell stack of claim 1, wherein the contact layer comprises:
at least two outer layers and a central layer,
wherein the central layer comprises the porous electrically conductive material and the chromium-getter material disposed in pores of the porous electrically conductive material, and
wherein the central layer has a porosity of between about 25% and about 70%.

8. The fuel cell stack of claim 1, wherein the contact layer comprises:
at least two outer layers and a central layer,
wherein the central layer comprises the porous electrically conductive material and the chromium-getter material disposed in the pores of the porous electrically conductive material, and
wherein the central layer has a porosity of between about 30% and about 50%.

9. The fuel cell stack of claim 8, wherein:
the central layer has a thickness of between about 10 μm and about 250 μm.

10. The fuel cell stack of claim 1, wherein:
the chromium-getter material is about 20% by volume of the contact layer.

11. The fuel cell stack of claim 1, wherein the electrode is a cathode.

12. The fuel cell stack of claim 1, wherein:
the contact layer has a thickness of between about 20 μm and about 525 μm.

13. The fuel cell stack of claim 1, wherein:
the interconnect comprises a coating of manganese cobalt oxide spinel phases.

14. The fuel cell stack of claim 1, wherein the chromium-getter material is an inorganic carbonate selected from the group consisting of lanthanum carbonate, calcium carbonate, lithium carbonate, sodium carbonate, sodium hydrogen carbonate, and barium carbonate.

15. The fuel cell stack of claim 1,
wherein the contact layer includes:
a first layer comprising a perovskite material, and
a second layer comprising the porous electrically conductive material and the chromium getter material disposed in the pores of the porous electrically conductive material.

16. A method of forming a chromium-getter contact layer in a fuel cell, the method comprising:
applying a first layer to a fuel cell electrode or a fuel cell interconnect, wherein the first layer comprises a perovskite material; and
applying a second layer to the first layer, wherein the second layer comprises:
a porous electrically conductive material, and
a chromium-getter material disposed in pores of the porous electrically conductive material, the chromium-getter material being selected from the group consisting of:
lanthanum oxide,
barium oxide,
lithium oxide,
sodium oxide, and
an inorganic carbonate, nitrate, hydroxide, or acetate that reacts with chromium vapor in a range of 300 to 850° C.

17. The method of forming a chromium-getter contact layer in a fuel cell of claim 16, wherein the chromium-getter material is an inorganic carbonate that comprises a cation and reacts with the chromium vapor to capture chromium atoms at an atomic percent ratio of cation to chromium of between about 1 and about 1.7 to 1.

18. The method of forming a chromium-getter contact layer in a fuel cell of claim 16, wherein the chromium-getter material is an inorganic carbonate comprises a cation and reacts with the chromium vapor to capture chromium atoms at an atomic percent ratio of cation to chromium of about 1 to 1.

* * * * *